United States Patent [19]
Meichtry et al.

[11] Patent Number: 6,098,227
[45] Date of Patent: Aug. 8, 2000

[54] FAN-POWERED EDGE-OF-DOCK LEVELER

[75] Inventors: Michael M. Meichtry, Brookfield; Donald G. Roth, Germantown, both of Wis.

[73] Assignee: Kelley Company, Inc., Mequon, Wis.

[21] Appl. No.: 09/186,959

[22] Filed: Nov. 5, 1998

[51] Int. Cl.$^7$ .................................................. E01C 11/04
[52] U.S. Cl. ............................................................ 14/69.5
[58] Field of Search ................................... 14/69.5, 71.1, 14/71.5, 71.3

[56] References Cited

U.S. PATENT DOCUMENTS

| | | | |
|---|---|---|---|
| 3,685,077 | 8/1972 | Wiener et al. ............................ | 14/71 |
| 4,665,579 | 5/1987 | Bennett et al. .......................... | 14/71.1 |
| 5,042,103 | 8/1991 | Megens ................................... | 14/71.7 |
| 5,088,143 | 2/1992 | Alexander ............................... | 14/69.5 |
| 5,274,867 | 1/1994 | Hageman ................................ | 14/71.7 |
| 5,446,938 | 9/1995 | Warner et al. ........................... | 14/69.5 |
| 5,450,643 | 9/1995 | Warner ................................... | 14/69.5 |
| 5,471,693 | 12/1995 | Hodges .................................. | 14/71.3 |
| 5,475,888 | 12/1995 | Massey .................................. | 14/69.5 |
| 5,481,774 | 1/1996 | Hodges et al. .......................... | 14/71.7 |
| 5,500,968 | 3/1996 | Hodges .................................. | 14/71.7 |
| 5,522,107 | 6/1996 | Hageman et al. ....................... | 14/69.5 |
| 5,522,108 | 6/1996 | Massey et al. .......................... | 14/69.5 |
| 5,600,859 | 2/1997 | Hodges et al. .......................... | 14/71.1 |
| 5,621,938 | 4/1997 | Warner ................................... | 14/69.5 |
| 5,651,155 | 7/1997 | Hodges et al. .......................... | 14/71.3 |
| 5,774,920 | 7/1998 | Alexander ............................... | 14/69.5 |

*Primary Examiner*—Eileen Dunn Lillis
*Assistant Examiner*—Raymond Addie
*Attorney, Agent, or Firm*—Michael Best & Friedrich LLP

[57] ABSTRACT

An edge-of-dock leveler includes a deck plate hingedly interconnected to a dock, a lip plate hingedly interconnected to the deck plate, an air pan mounted on the face of the dock to allow the air pan to rotate with respect to the dock, and a blower mounted on the air pan. The blower inflates an air bag that causes the air pan to rotate away from the dock face. A deck plate bearing is provided between the air pan and the deck plate, and causes the deck plate to rotate with the air pan. A locking arm hangs pendant from the lip plate until the deck plate has raised to a fully raised position, at which time the locking arm engages a bearing. The blower is turned off, allowing the air to escape the air bag, and the lip plate to extend as the air bag deflates.

19 Claims, 7 Drawing Sheets

FAN-POWERED EDGE-OF-DOCK LEVELER

FIELD OF THE INVENTION

The present invention relates to edge-of-dock levelers.

BACKGROUND

Dock levelers are used to bridge the gap between a vehicle (e.g., a truck or a trailer) and a loading dock at which the vehicle is parked for unloading or loading. Dock levelers include pit-type dock levelers, which are mounted within a pit in the loading dock, and edge-of-dock levelers, which are mounted on the front edge of the loading dock.

Prior art edge-of-dock levelers include manual levelers wherein an operator uses a lever to raise the edge-of-dock leveler above the level of a vehicle bed parked adjacent to the dock. The leveler is then lowered and a lip extends to engage the vehicle bed. These edge-of-dock levelers commonly include a spring that biases the edge-of-dock leveler upwardly to assist the operator when raising the leveler.

Other prior art edge-of-dock levelers include powered levelers. For example, one type of powered edge-of-dock leveler utilizes a hydraulic actuator to raise and lower the leveler. Another type of edge-of-dock leveler includes a fan or blower and an air bag. The air bag is inflated with the blower, raising the edge-of-dock leveler through a linkage. Examples of powered edge-of-dock levelers utilizing a blower and air bag are disclosed in U.S. Pat. Nos. 5,450,643 and 5,621,938.

SUMMARY

Several disadvantages have been identified in prior art dock levelers and edge-of-dock levelers. Hydraulic dock levelers are generally very expensive, and can require significant modification to the loading dock. Manual edge-of-dock levelers are controlled by an operator, and usually have an upwardly-biased spring mechanism. The upward spring-bias utilized in manual edge-of-dock levelers often causes the edge-of-dock leveler to bounce as material handling devices are moved across them, creating a less stable device. Prior art fan-powered edge-of-dock levelers include relatively complex linkages, and therefore can be more difficult to service.

The present invention provides an edge-of-dock leveler adapted to be mounted to the face of a loading dock. The leveler of the present invention includes a deck plate, a lip plate, and a removable air pan. A retaining member is mounted on the dock face, and a portion of the air pan is received in the retaining member. The air pan is therefore removably mounted on the face of the loading dock for rotation with respect to the dock face.

Mounted on the air pan is a blower. An air bag having a plurality of air lobes is mounted on one of the dock face and the air pan, and includes apertures through which the blower forces air into the bag. When the air bag is deflated, it hangs pendant between the loading dock face and the air pan. As the lobes are inflated by the blower, the lobes abut against the dock face and against the air pan, causing the air pan to pivot about the retaining member away from the face of the dock. The air pan includes at least one deck plate bearing that abuts the underside of the deck plate of the leveler. As the air pan is raised or lowered in response to inflation or deflation of the air bag, the air pan raises and lowers the deck plate through the deck plate bearing. One or more biasing members are provided to bias the deck plate and the air pan down toward the dock face.

The edge-of-dock leveler of the present invention also includes a lip lifter arm. The lip lifter arm hangs pendant from the lip plate as the deck plate is raised. When the deck plate has been raised to a predetermined level, a notch in the lip lifter arm engages a bearing mounted on the loading dock. The blower is then turned off, allowing the deck to settle downwardly under the influence of gravity and the biasing members, and forcing air out of the air lobes and through the blower. The blower fan provides resistance to the flow of air out of the air lobes, thereby causing the deck plate to settle at a controlled rate. As the deck plate is lowered, the lip lifter arm causes the lip plate to extend and come to rest on a portion of the vehicle.

DETAILED DESCRIPTION

Figure 1:
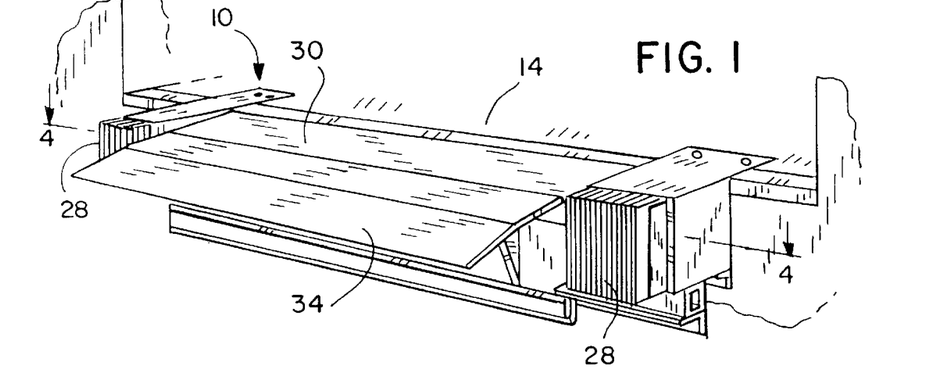
FIG. 1 is a perspective view of a loading dock having the edge-of-dock leveler of the present invention mounted thereon.
Figure 2:
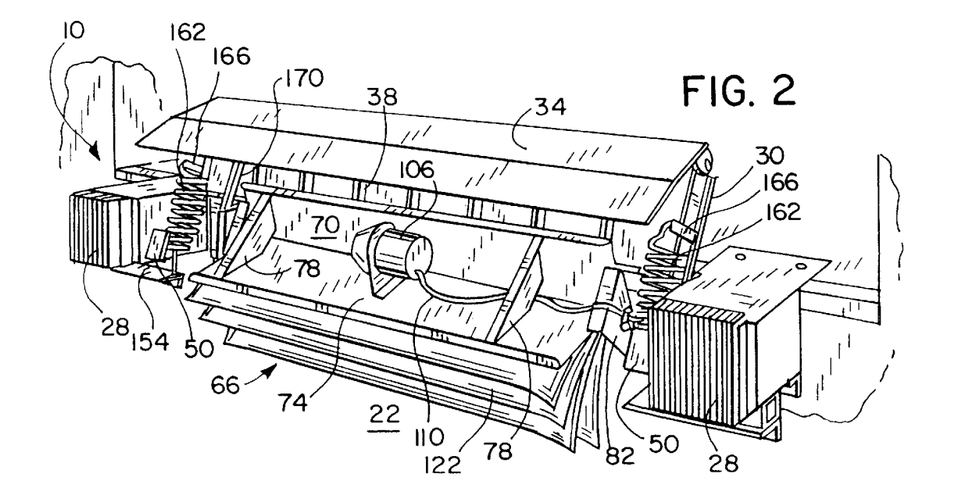
FIG. 2 is a perspective view of the edge-of-dock leveler in a fully inflated position.
Figure 3:
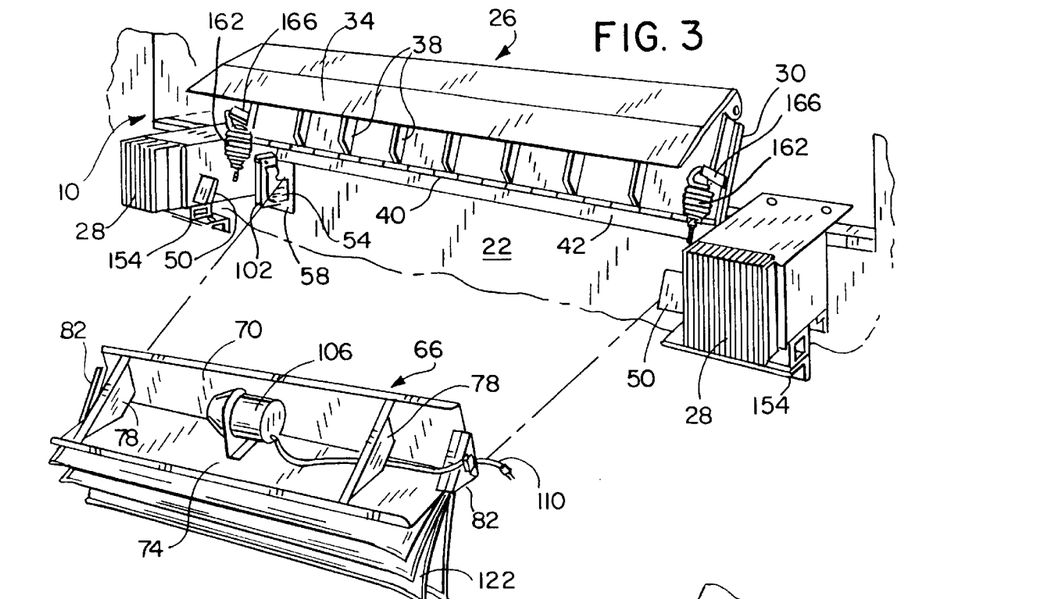
FIG. 3 is a partially exploded view of the edge-of-dock leveler.

FIGS. 1–3 illustrate a loading dock 10 for loading and unloading a vehicle (not shown). The dock 10 generally includes a top portion having a loading/unloading surface 14 over which forklifts and the like travel. The dock 10 also includes a dock face 22 to which an edge-of-dock leveler 26 is mounted.

Figures 5, 6:
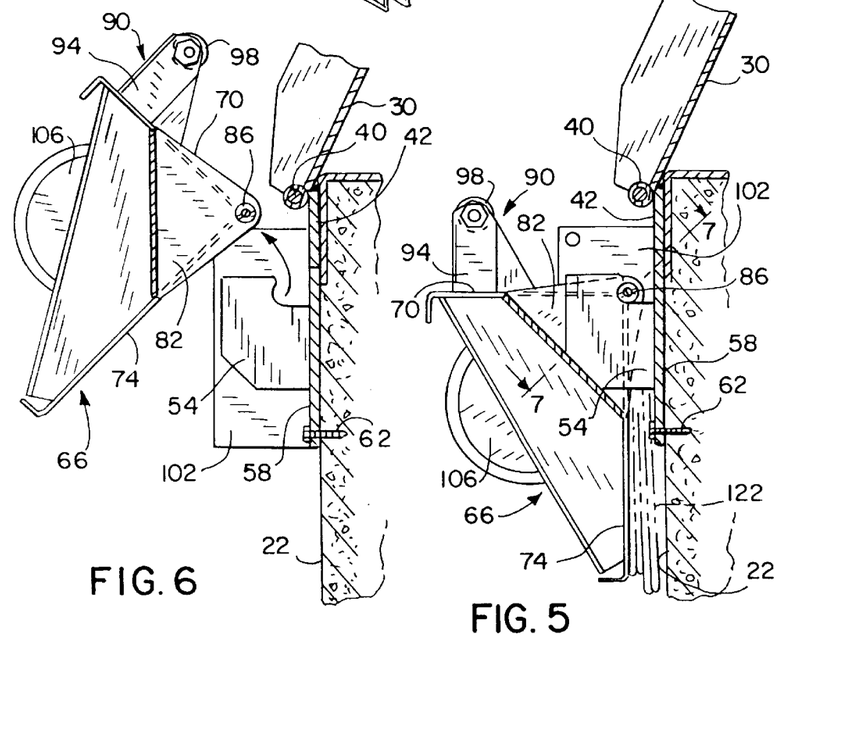
FIG. 5 is a cross-section view taken along line 5—5 in FIG. 4 with the deck plate fully raised.
FIG. 6 is a cross-section view taken along line 5—5 in FIG. 4 showing the air pan being removed from the dock face.
Figure 7:
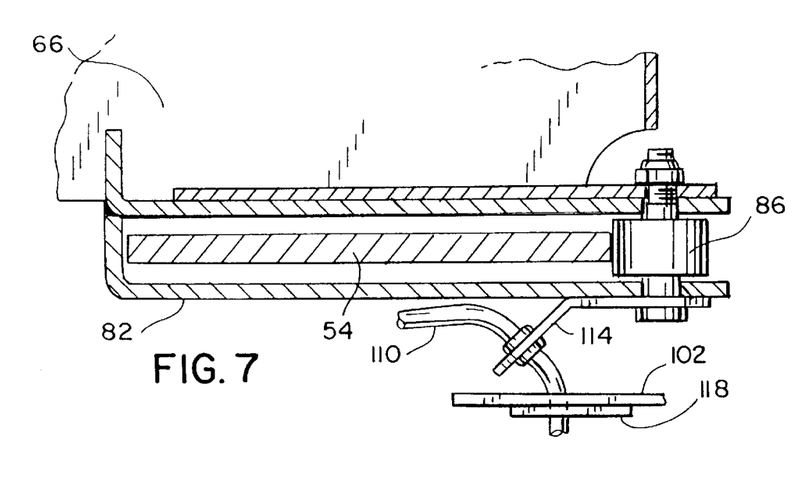
FIG. 7 is a cross-section view taken along line 7—7 in FIG. 5.

The leveler 26 generally includes a pair of bumpers 28 for stopping the vehicle at a location spaced from the dock 10, a deck plate 30, and a lip plate 34. The deck plate 30 includes ribs 38 that stiffen the deck plate 30. As seen in FIGS. 3, 5, and 6, the deck plate 30 is hingedly interconnected by way of a deck plate hinge 40 with a base plate or hinge plate 42 mounted on the dock face 22 via welds and concrete anchor bolts 62. The deck plate 30 is movable between a lowered or deflated position, shown in FIG. 1, and a raised or inflated position, shown in FIG. 2. When the deck plate 30 is in the lowered position, the deck plate 30 is supported by a support member 50 that extends away from each of the bumpers 28 of the dock 10. When the deck plate 30 is in the raised position, the deck plate 30, and the rest of the leveler 26, will remain in the raised position until a force is applied to the deck plate 30 causing the deck plate 30 to rotate, at which time gravity and a biasing force (explained below) will pull the deck plate 30 toward the lowered position.

Figures 15, 16:
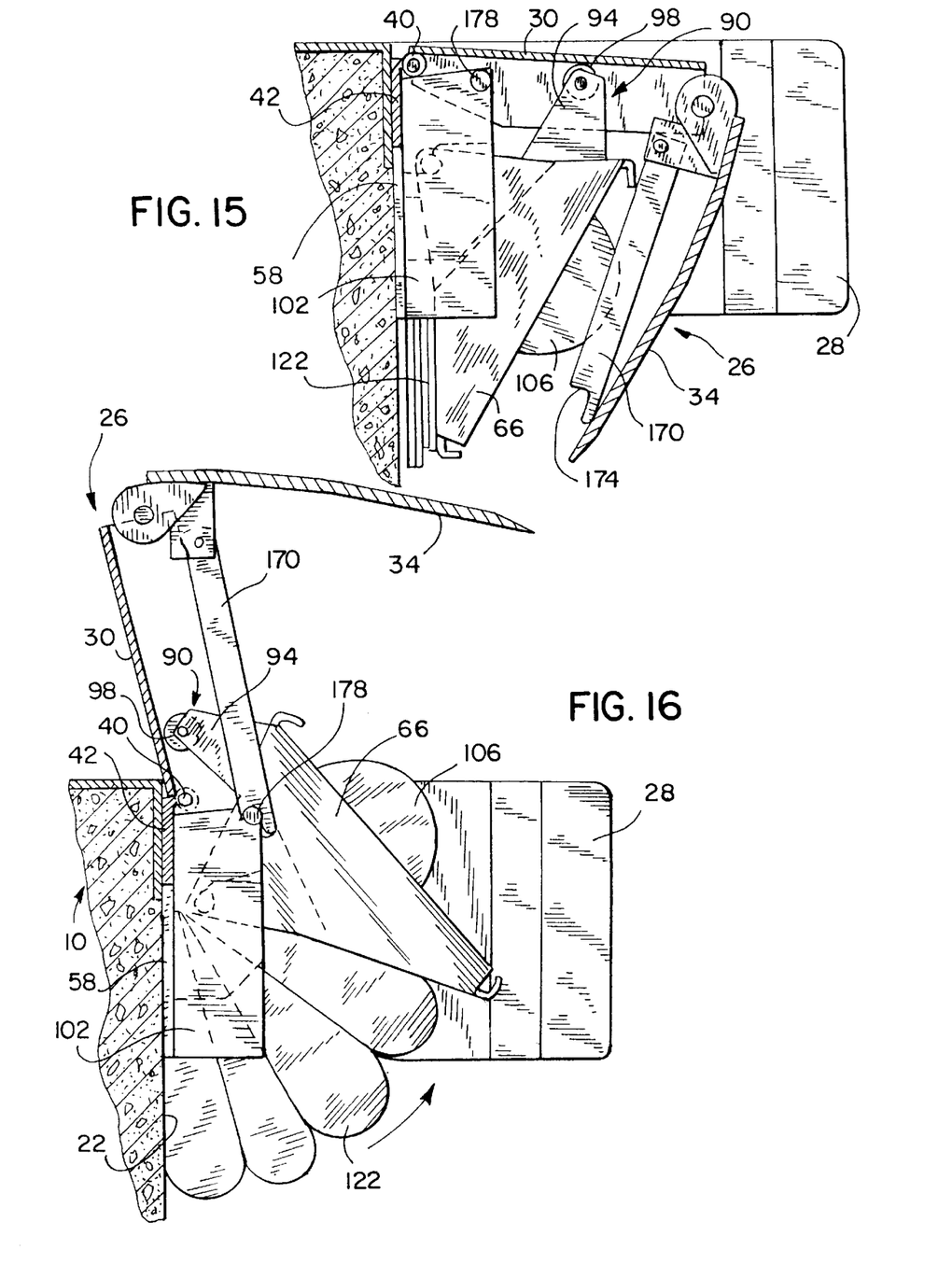
FIG. 15 is a cross-section view taken along line 15—15 in FIG. 4.
FIG. 16 is a cross-section view taken along line 15—15 in FIG. 4, showing the lip lifter arm engaging the bearing.

The lip plate 34 is hingedly interconnected with the deck plate 30. The lip plate 34 is movable relative to the deck plate between an extended position (FIGS. 1 and 17) and a pendant position (FIG. 15).

A pair of retaining members (FIGS. 3, 5, and 6), which in the illustrated embodiment are hook members 54, are mounted on a pair of retaining plate members 58 that are mounted on the dock face 22 with concrete anchor bolts 62. The hook members 54 are designed to detachably support an air pan 66, as described below in more detail.

The air pan 66 is generally L-shaped in profile (see FIGS. 5 and 6). The air pan 66 includes an upper leg 70, a lower leg 74, a pair of gusset members 78 (FIGS. 2 and 3) extending between the legs 70, 74 to stiffen the air pan 66, and end caps 82 connected to the ends of the upper and lower legs 70, 74. The upper leg 70, lower leg 74, and gusset members 78 in the illustrated configuration are made from formed sheet metal that is welded together. The end caps 82 include pivot bearings 86 that are received in the hook members 54 to detachably hold the air pan 66 adjacent to the dock face 22 and to allow the air pan 66 to rotate with respect to the dock face 22. The illustrated pivot bearings 86 comprise replaceable bearings made of steel tubing with bronze bushings or other bushing material.

The illustrated air pan 66 is approximately 55 inches long, and may be used with a base plate 42 between 66 inches and 84 inches long. Existing manual edge-of-dock levelers may be converted to the leveler of the present invention regardless of the length of the base plate 42, deck plate 30, and lip plate 34 of the existing edge-of-dock leveler.

One or more (e.g., two) deck plate bearing assemblies 90 are provided on the upper leg 70 of the air pan 66. The illustrated deck plate bearing assemblies 90 (see FIGS. 5, 6, and 15–17) include a bracket 94 mounted on the upper leg 70 at one end, and a ball bearing race or roller member 98 mounted at an opposite end of the bracket 94. When the air pan 66 is raised, as described below, the roller members 98 abut the underside of the deck plate 30 and causes the deck plate 30 to rotate about the deck plate hinge 40. The roller members 98 rotate with the pan 66 and roll along the underside of the deck plate 30 to accommodate the relative movement between the deck plate 30 and the air pan 66 caused by the non-collinear pivot axes of the deck plate 30 and the air pan 66.

In this regard, the deck plate bearing assemblies 90 translate along the underside of the deck plate 30 as the assemblies 90 rotate. As used herein, "translate along" means that the portion of the deck plate bearing assemblies 90 that contacts the deck plate 30 is free to travel along a portion of the deck plate (e.g., the bearing assemblies 90 are not pinned or fastened to the deck plate 30). Although the illustrated deck plate bearing assemblies 90 include roller members 98 that roll along the underside of the deck plate 30, alternative embodiments may include members that slide along the underside of the deck plate 30, for example. Also, in alternative embodiments, the deck plate 30 may be provided with guide slots or rails in which the roller members 98 travel to ensure the roller members 98 translate along the deck plate 30 in a substantially straight line.

In an alternative embodiment (not shown), the deck plate bearing assemblies 90 may be mounted on the lower leg 74. In this embodiment, the support 94 would be lengthened to allow the roller members 98 to contact the underside of the deck plate 30, and the upper leg 70 would no longer be necessary.

Figures 4, 9, 10:
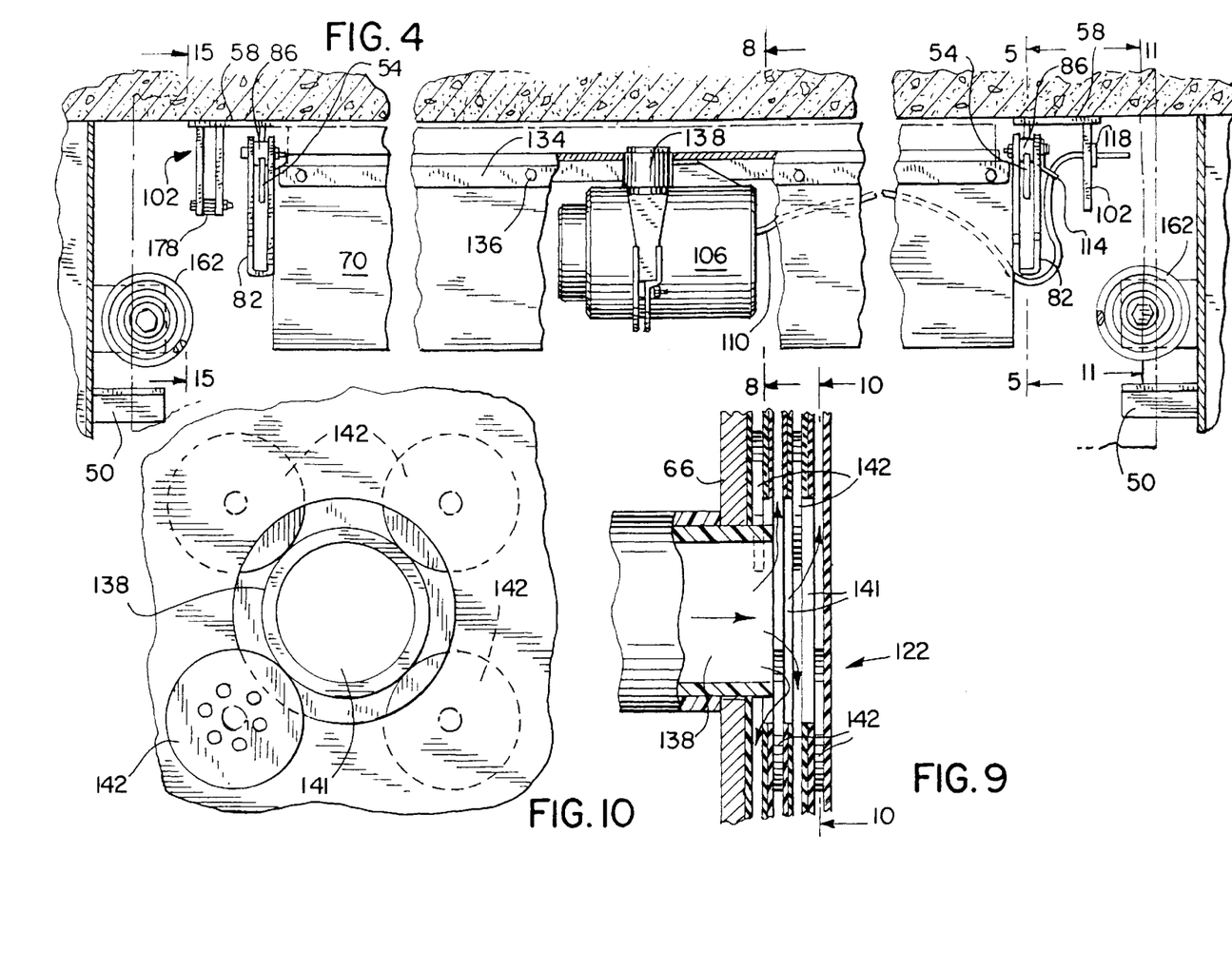
FIG. 4 is a cross-section view taken along line 4—4 in FIG. 1.
FIG. 9 is a cross-section view taken along line 9—9 in FIG. 8.
FIG. 10 is a cross-section view taken along line 10—10 in FIG. 9.

A pair of reinforcing flanges 102 are welded or otherwise mounted across both the base plate 42 and the retaining plate members 58 (FIGS. 3 and 4). In operation, much of the weight of the deck plate 30 and lip plate 34 is born by the air pan 66 and the hook members 54. Consequently, a large bending moment is applied to each of the retaining plate members 58. The reinforcing flanges 102 provided resistance to such bending moments.

A blower 106 is mounted on the air pan 66 between the upper and lower legs 70, 74. A power cord 110 extends from the blower 106, past one of the gussets 78, around one of the end caps 82, through a power cord bracket 114 (FIG. 4), through a power cord bushing 118 that is provided in one of the reinforcing flanges 102, and to a power source having a switch (not shown). The cord 110 rotates approximately 90° each time the deck plate 30 is rotated from the lowered position to the raised position. The power cord bushing 118 provides a low friction bearing surface to prevent wear caused by the above rotation.

Figure 8:
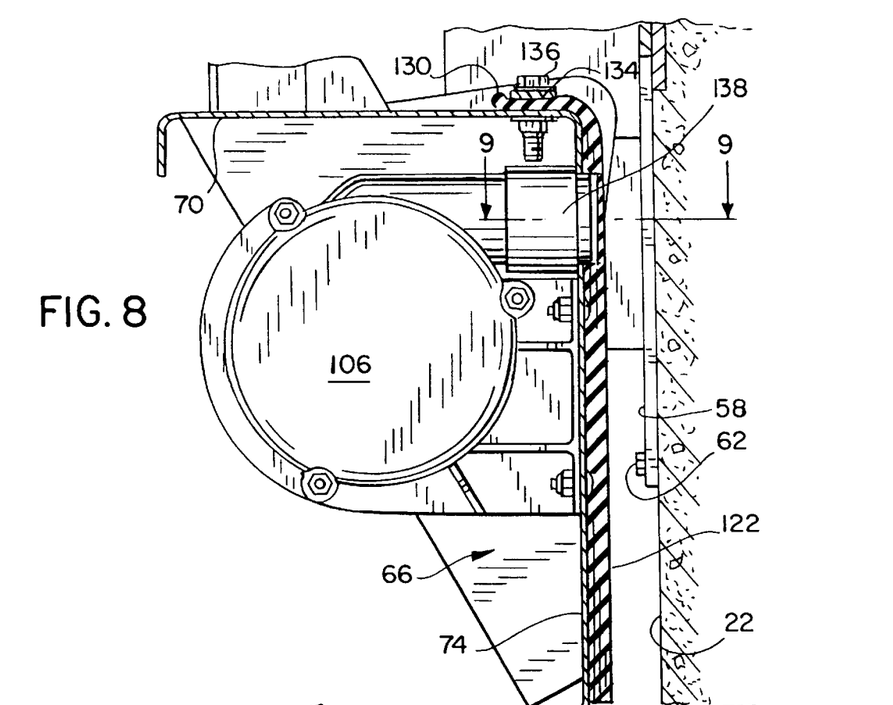
FIG. 8 is a cross-section view taken along line 8—8 in FIG. 4.
Figure 13:
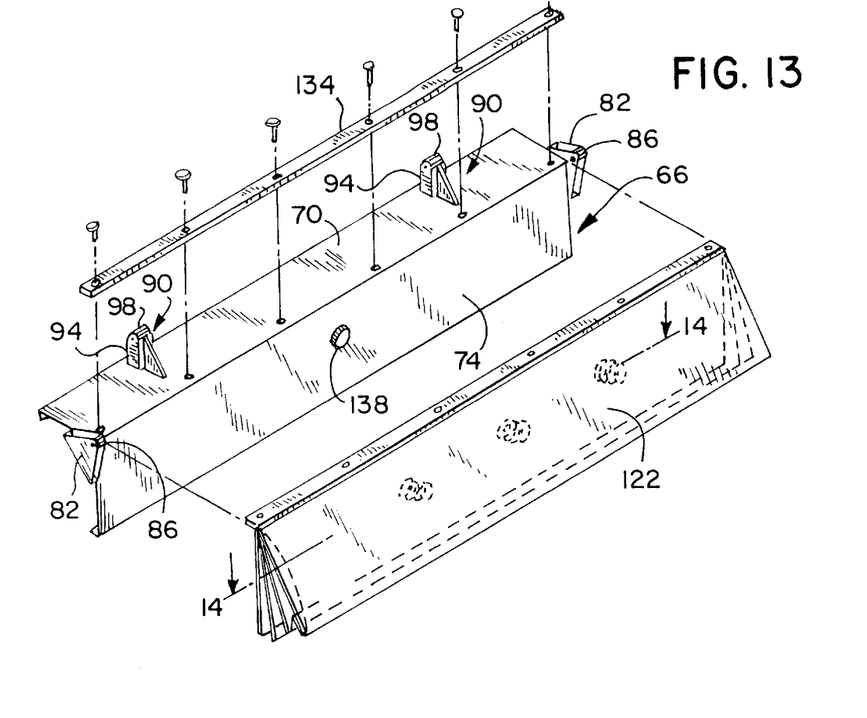
FIG. 13 is an exploded view of the air pan and air bag.
Figure 14:
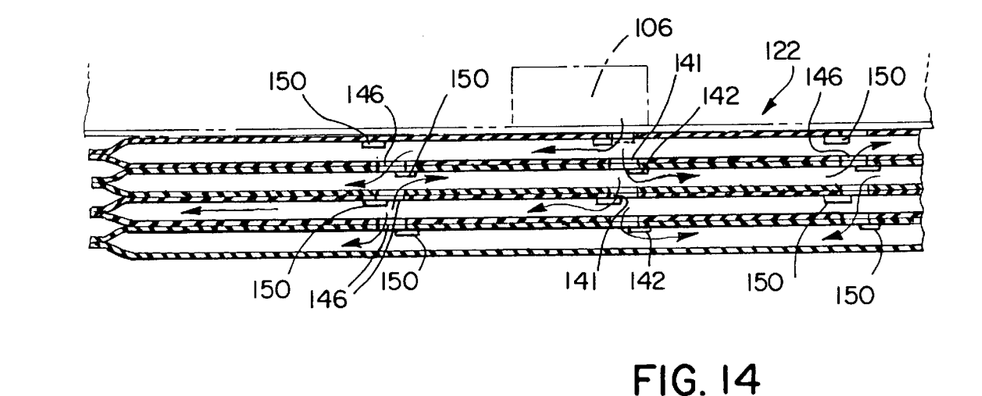
FIG. 14 is a cross-section view taken along line 14—14 in FIG. 13.

An air bag 122 is mounted on the air pan 66 between the lower leg 74 and the dock face 22 (FIGS. 8, 13, and 14). The illustrated air bag 122 includes several lobes that comprise PVC coated Nylon cloth that is folded and secured in the illustrated configuration. As seen in FIGS. 13 and 8, the air bag 122 includes a mounting portion 130 that is sandwiched between a mounting member 134 (e.g., a strip of metal) and the air pan 66 via fasteners 136 (e.g., bolts). In the deflated condition, the air bag hangs pendant between the dock face 22 and the lower leg 74 of the air pan 66. The illustrated air bag 122 includes four lobes. The two front lobes are shorter than the rear lobes so that the front lobes clear a vehicle restraint (not shown) as they inflate.

Referring now to FIGS. 4, 9, 10, 13, and 14, the blower 106 is equipped with an outlet 138 through which air is forced. The outlet 138 is in fluid communication with an aperture in the air pan 66 and with the air bag 122. The air bag 122 is provided with apertures 141 in each lobe to allow air to pass from one lobe into the next. Spacers 142 are disposed within each lobe adjacent the apertures 141. The spacers 142 are preferably made of urethane or plastic, and are glued to the bag 122. The spacers 142 ensure that air from the blower 106 will enter each lobe, and that air pressure in each lobe is equal to that in the other lobes, thereby causing the lobes to fill relatively evenly. As the air bag 122 is inflated, air enters each of the lobes and the bag 122 expands against both the lower leg 74 of the air pan 66 and the dock face 22. The pressurized air entering each lobe causes a pressure seal around the perimeter so that air does not escape the air bag 122 in any significant quantity. The lobes may also be provided with additional apertures 146 (FIG. 14) and spacers 150 to further ensure even distribution of air within the air bag 122.

Figure 11:
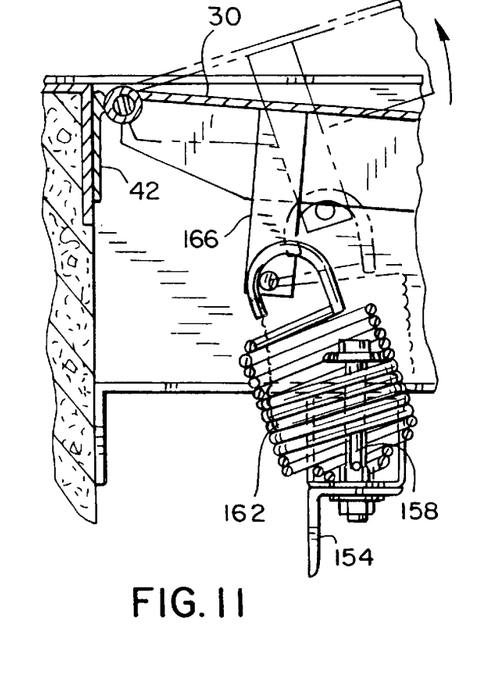
FIG. 11 is a cross-section view taken along line 11—11 in FIG. 4 showing a long spring mounting bolt.
Figure 12:
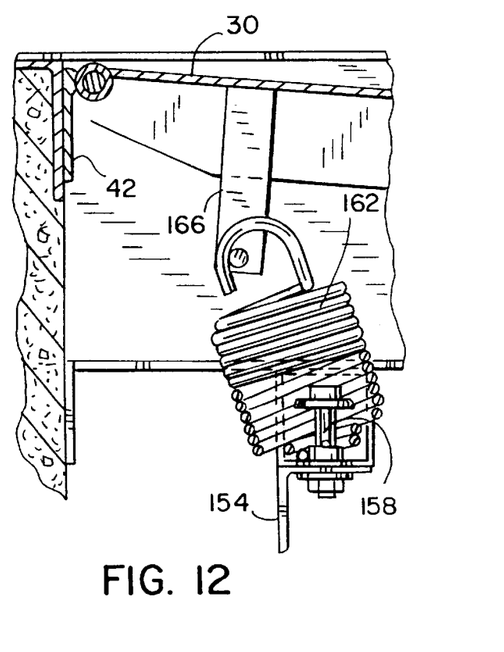
FIG. 12 is a cross-section view taken along line 11—11 in FIG. 4 showing a short spring mounting bolt.

Referring now to FIGS. 11 and 12, a lower spring support 154 extends from each bumper 28. The illustrated lower spring support 154 includes an L-shaped steel beam welded to a square beam. A bore is provided in the L-shaped steel beam, allowing a spring mounting bolt 158 to pass therethrough. A biasing member, which in the illustrated embodiment is a spring 162, extends between the spring mounting bolt 158 and an upper spring support 166 secured to the deck plate 30. As the deck plate 30 is moved from the lowered position to the raised position, the spring 162 expands and provides a biasing force toward the lowered position. The biasing force causes the deck plate 30 to rotate about the hinge 40 toward the lowered position. When the deck plate 30 is in the lowered position shown in FIGS. 11 and 12, the lower end of the spring 162 surrounds the shank portion of the spring mounting bolt 158. As the deck plate 30 is raised, the lower end of the spring 162 rises along the shank of the bolt 158 and eventually abuts the head of the bolt 158. This provides a "lost-motion" effect wherein the spring 162 does not provide a downward biasing force until the lower end of the spring 162 engages the bolt head. Thus, the amount of downward bias exerted by a given spring 162 on the deck plate 30 can be controlled by the length of the spring mounting bolt 158.

FIG. 11 illustrates a long spring mounting bolt 158 while FIG. 12 illustrates a relatively short spring mounting bolt 158. The long spring mounting bolt 158 will cause a relatively small downward biasing force when the deck plate 30 is in the raised position while the shorter spring mounting bolt 158 will cause a relatively large downward biasing force when the deck plate 30 is in the raised position. For edge-of-dock levelers having very heavy deck plates 30 and lip plates 34, a shorter spring mounting bolt 158 is used to create a larger biasing force. The larger biasing force ensures that the heavier deck plate 30 and lip plate 34 will begin rotating toward the lowered position when the blower 106 is turned off. A longer spring mounting bolt 158, creating a lower biasing force in the springs 162 when the deck plate 30 is in the raised position, may be used for lighter deck and lip plates 30, 34. In this regard, a single spring 162 can be provided and the leveler 26 can be customized by way of the spring mounting bolts 158, which are relatively inexpensive and easily obtained.

A lip lifter arm 170 is pivotally connected to the underside of the lip plate 34. The lip lifter arm 170 includes a notch 174 at its distal end. A bearing 178 (FIGS. 4 and 15–17) is mounted on the base plate 42. The illustrated bearing 178 includes a pin mounted between a pair of plates that include one of the reinforcing flanges 102. When the deck plate 30 is in the lowered position, and there is no vehicle present at the dock 10, the lip lifter arm 170 hangs downward in a pendant position (FIG. 15). As the deck plate 30 approaches the raised position, the lip lifter arm 170 swings toward the bearing 178, and the notch 174 in the lip lifter arm 170 receives the bearing 178 (FIG. 16).

Figure 17:
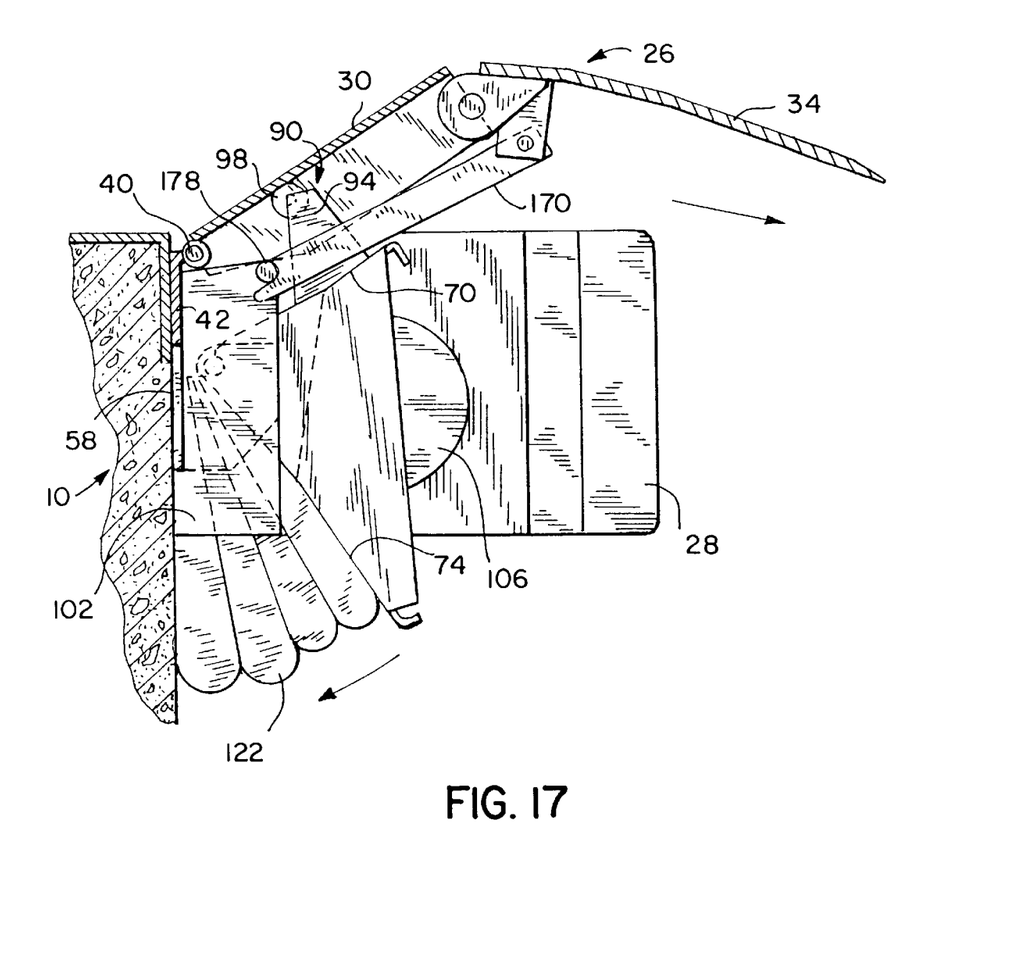
FIG. 17 is a cross-section view taken along line 15—15 in FIG. 4, showing the lip plate moving toward the extended position.

When the deck plate 30 has reached the raised position, the blower 106 is turned off, and the deck plate 30 is pulled down toward the lowered position by the springs 162 and by gravity. As the deck plate 30 is pulled down toward the lowered position, air in the bag 122 is expelled through the blower 106. A fan or impeller (not shown) in the blower 106 provides resistance to the air flow, and causes the deck plate 30 to lower in a controlled manner. As the deck plate 30 lowers, the lip plate 34 is extended due to the lip lifter arm's 170 engagement with the bearing 178 (FIG. 17). The deck plate 30 and lip plate 34 cease to lower when the lip plate 34 comes to rest on the vehicle, at which time the lip lifter arm 170 disengages the bearing 178.

After cargo has been loaded or unloaded from the vehicle, the blower 106 is again turned on, and the air bag 122 is inflated until the deck plate 30 is partially raised and the lip plate 34 has disengaged the vehicle. Then the blower 106 is turned off, allowing the deck plate 30 to return to the lowered position with the lip plate 34 and lip lifter arm 170 hanging in the pendant position (FIG. 15).

As illustrated in FIG. 3, the deck plate 30 may also be maintained in the raised position while the other components of the edge-of-dock leveler 26 are being serviced. To maintain the deck plate 30 in the raised position, the spring mounting bolts 158 are first detached from the lower spring support 154 to allow the springs 162 and spring mounting bolts 158 to hang freely from the deck plate 30. Then the air bag 122 is inflated to raise the deck plate 30 to the raised position. The deck plate 30 will stay in the raised position until the deck plate 30 is rotated a predetermined amount toward the lowered position. When the deck plate 30 is in the raised position, the air pan 66 may be removed (FIGS. 3 and 6), and easy access is provided to the other components of the edge-of-dock leveler 26.

Although particular embodiments of the present invention have been shown and described, other alternative embodiments will be apparent to those skilled in the art and are within the intended scope of the present invention. Thus, the present invention is to be limited only by the following claims.

What is claimed is:

1. A dock leveler for use with a loading dock having a dock face, the dock leveler comprising:
   a deck plate being able to be movably mounted to the dock and movable between a lowered position and a raised position;
   an air bag engaging surface disposed substantially parallel to the dock face;
   an air bag positioned under said deck plate such that said air bag hangs pendant when deflated, said air bag engages said air bag engaging surface when deflated, and while inflated; and
   a blower in fluid communication with said air bag, wherein inflation of said air bag causes said deck plate to move with respect to the dock.

2. The dock leveler of claim 1, wherein said air bag is being able to hang adjacent a face of the loading dock when deflated, and wherein said air bag is able to abut the dock face when inflated.

3. The dock leveler of claim 1, wherein said air bag includes a plurality of lobes, at least one of said lobes being shorter than another of said lobes.

4. The dock leveler of claim 1, further comprising a biasing member being able to be interconnected between said deck plate and the dock to provide a biasing force on said deck plate toward said lowered position, wherein inflation of said air bag causes said deck plate to move against said biasing force from said lowered position to said raised position.

5. The dock leveler of claim 4, further comprising a spring mounting bolt being able to connect said biasing member to the dock, wherein an end of said biasing member is connected to said spring mounting bolt to provide lost motion to said biasing member.

6. The dock leveler of claim 1, wherein said air bag hangs substantially vertically.

7. The dock leveler of claim 1, further comprising a pan movably positioned under said deck plate, wherein said blower is mounted on said pan.

8. The dock leveler of claim 7, wherein said air bag is mounted on said pan.

9. The dock leveler of claim 7, wherein said pan is substantially L-shape in cross-section.

10. The dock leveler of claim 1, wherein said air bag includes a plurality of lobes, said lobes each defining an aperture placing each lobe in fluid communication with the other lobes and with said blower.

11. The dock leveler of claim 1, wherein said deck plate is able to be hingedly interconnected with the loading dock.

12. A dock leveler for use with a loading dock having a dock face, the dock leveler comprising:
- a deck plate being able to be interconnected with the loading dock for movement between a lowered position and a raised position;
- a pan positioned under said deck plate for movement with respect to said deck plate, said pan including a bag-engaging portion and a deck plate-engaging portion, said deck plate-engaging portion being able to translate along a portion of said deck plate; and
- an air bag, said air bag hanging pendant when deflated such that a longitudinal extent of said air bag is substantially parallel to the dock face;
- whereby said air bag is in abutment with said bag-engaging portion upon inflation of said air bag, and causes said deck plate-engaging portion to abut said deck plate and move said deck plate toward said raised position.

13. The dock leveler of claim 12, further comprising a blower mounted on said pan and in fluid communication with said air bag to cause inflation of said air bag.

14. The dock leveler of claim 12, wherein said deck plate-engaging portion includes a roller for abutting against said deck plate and rolling with respect to said deck plate.

15. The dock leveler of claim 12, wherein said deck plate is able to be hingedly interconnected with the loading dock.

16. The dock leveler of claim 12 where said pan in L-shaped.

17. The dock leveler of claim 12, wherein said air pan rotates approximately 90° between said raised position and said lowered position.

18. The dock leveler of claim 12, wherein said air bag is secured to said pan.

19. The dock leveler of claim 18, wherein a portion of said air bag is sandwiched between a mounting member and said pan.

* * * * *

UNITED STATES PATENT AND TRADEMARK OFFICE
CERTIFICATE OF CORRECTION

PATENT NO : 6,098,227
DATED : August 8, 2000
INVENTOR(S): Michael M. Meichtry, Donald G. Roth

It is certified that error appears in the above-identified patent and that said Letters Patent are hereby corrected as shown below:

Claim 16, column 8, line 12, delete "where" and insert --wherein-- and, same line, delete "in" and insert --is--.

Signed and Sealed this

Twenty-fourth Day of April, 2001

Attest:

NICHOLAS P. GODICI

Attesting Officer

Acting Director of the United States Patent and Trademark Office